(12) United States Patent
Harats et al.

(10) Patent No.: US 9,360,234 B2
(45) Date of Patent: Jun. 7, 2016

(54) SYSTEM FOR IMPROVED HYBRIDIZATION OF THERMAL SOLAR AND BIOMASS AND FOSSIL FUEL BASED ENERGY SYSTEMS

(75) Inventors: Yehuda Harats, Jerusalem (IL); Ian Brown, Jerusalem (IL)

(73) Assignee: Yehuda Harats, Jerusalem (IL)

( * ) Notice: Subject to any disclaimer, the term of this patent is extended or adjusted under 35 U.S.C. 154(b) by 364 days.

(21) Appl. No.: 14/234,997

(22) PCT Filed: Jul. 26, 2012

(86) PCT No.: PCT/IL2012/000287
§ 371 (c)(1),
(2), (4) Date: Jan. 24, 2014

(87) PCT Pub. No.: WO2013/014664
PCT Pub. Date: Jan. 31, 2013

(65) Prior Publication Data
US 2014/0182576 A1  Jul. 3, 2014

Related U.S. Application Data

(60) Provisional application No. 61/512,000, filed on Jul. 27, 2011.

(51) Int. Cl.
| | |
|---|---|
| *F24J 2/00* | (2014.01) |
| *F01K 3/00* | (2006.01) |
| *F01K 3/12* | (2006.01) |
| *F22B 1/00* | (2006.01) |

(52) U.S. Cl.
CPC ............... *F24J 2/0023* (2013.01); *F01K 3/004* (2013.01); *F01K 3/12* (2013.01); *F22B 1/006* (2013.01); *Y02E 20/14* (2013.01); *Y02E 50/11* (2013.01)

(58) Field of Classification Search
CPC .......... F01K 3/004; F01K 3/12; F24J 2/0023; F22B 1/006
USPC .............. 126/572, 611, 642; 60/641.2, 641.8, 60/659, 660
See application file for complete search history.

(56) References Cited

U.S. PATENT DOCUMENTS

| | | | |
|---|---|---|---|
| 5,444,972 A | 8/1995 | Moore | |
| 8,087,245 B2 * | 1/2012 | Quero | ..................... F03G 6/065 60/641.11 |

(Continued)

FOREIGN PATENT DOCUMENTS

CN  101968041  2/2011

OTHER PUBLICATIONS

ISR completed Mar. 12, 2013 of PCT/IL2012/000287.

*Primary Examiner* — Gregory Huson
*Assistant Examiner* — Nikhil Mashruwala
(74) *Attorney, Agent, or Firm* — Schmeiser, Olsen & Watts LLP

(57) ABSTRACT

A hybridization system (15) for use in a hybrid energy plant (35, 50, 60, 70) that includes a first thermal energy unit (10) powered by solar energy and a second non-solar thermal energy unit (11) for providing thermal energy to a user (16) via first and second heat transfer fluids (HTF) respectively. The hybridization system includes a mixing unit (45) for mixing the thermal energy of the first and second heat transfer fluids either directly or indirectly so as to form a unified heat transfer fluid that is fed to the user. In some embodiments a thermal energy storage unit (28) and mixing unit (45) are coupled directly or indirectly to the first and second thermal energy units for receiving, storing and mixing thermal energy from the thermal energy units, so as to form either directly or indirectly a unified heat transfer fluid that is fed to the user.

18 Claims, 7 Drawing Sheets

(56) References Cited

U.S. PATENT DOCUMENTS

| | | | |
|---|---|---|---|
| 2008/0022685 A1 | 1/2008 | Zhu | |
| 2009/0205335 A1 | 8/2009 | Wohlleib | |
| 2012/0102950 A1* | 5/2012 | Turchi | F01K 23/10 60/641.15 |
| 2014/0202156 A1* | 7/2014 | Clement | F22B 1/006 60/649 |
| 2015/0000277 A1* | 1/2015 | Reynolds | F03G 6/067 60/641.15 |
| 2015/0167648 A1* | 6/2015 | Bergan | F24J 2/06 60/641.15 |
| 2015/0260463 A1* | 9/2015 | Laughlin | F02C 1/10 165/10 |

* cited by examiner

US 9,360,234 B2

SYSTEM FOR IMPROVED HYBRIDIZATION OF THERMAL SOLAR AND BIOMASS AND FOSSIL FUEL BASED ENERGY SYSTEMS

FIELD OF THE INVENTION

The present invention relates to Combined Heat and Power (CHP) applications.

BACKGROUND OF THE INVENTION

Electricity generation from solar energy suffers from a fundamental problem of reliance on an unpredictable and variable source of energy. To some extent this problem can be mitigated by using thermal energy storage systems which can extend the availability of solar energy beyond daylight hours, and even to 24 hours if the storage is sufficiently large, but after periods of low or no radiation even the storage system will not be able to provide the energy required to render the plant as capable of delivering base-load electricity reliably. Put simply, it is not feasible realistically to build an electric generation capacity using solar energy that is fully base-load capable and dispatch manageable without supplementing the solar energy with some other source of thermal energy.

The approach taken then is to supplement the thermal energy developed from solar radiation with thermal energy from an auxiliary source. This source is usually a fossil fuel such as liquefied natural gas (LNG), liquefied petroleum gas (LPG) or distillates. These fuels are favoured because the boilers and heaters which burn these fuels can be designed for quick start and stop, cycling duties and low load duties. These characteristics complement the variability and unpredictability of solar radiation, and yield a stable generation capacity.

However, this type of system does not address the fundamental concern of establishing a truly renewable source of base-load electricity generation, reliant as it is on the non-renewable fossil fuel for levelling and supplementing production.

The alternative is to use a renewable auxiliary fuel, such as biomass. This presents a problem of configuration and control, which is addressed by the present invention.

Effective hybridization of a thermal solar field with a biomass system involves melding two distinct sources of thermal energy, and delivering that energy seamlessly to the power block for the generation of electricity. A general scheme of such a process is shown schematically in FIG. 1.

Thus, in FIG. 1, thermal energy is obtained from a solar field 10 that uses solar radiation as the prime energy source (CSP) and from a biomass system 11 that uses energy source such as a wood fire, organic waste municipal waste and other non-solar thermal energy sources (BM). The thermal energy from these two distinct sources is fed to a hybridization system 15 that facilitates the combination of two systems that feature different characteristics, namely that solar energy fluctuates in accordance with the sun insolation, while the biomass system is limited in its ability to follow the solar system variations. The hybridization system 15 feeds thermal energy which can be eventually used by a turbo-generator 16 that produces electricity 17 or by other thermal energy users.

FIG. 2 shows schematically a biomass fired boiler 20 arranged in parallel with a solar steam generator 21 and can be used to supplement steam output either partially or completely in times of little or no solar radiation prior to feeding to a turbine (such as 16 in FIG. 1). Such an arrangement combines in a simple fashion the two technologies with system integration at the point of steam supply to the turbine. Heat transfer fluid 22 from the solar field 10 is fed via a first valve 23 to the solar steam generator 21 and cooler heat transfer fluid 24 is pumped back to the solar field by a pump 25. Steam 26 produced by the solar steam generator 21 is fed in parallel with steam produced by the biomass fired boiler 20 to the turbine and condensate 27 is returned to both the biomass fired boiler 20 and the solar steam generator 21 where it is re-heated in an ongoing cycle. In order to exploit solar thermal energy even in the absence of solar insolation, thermal energy storage (TES) 28 may be coupled to the solar steam generator 21 via a second valve 29. Solar thermal energy stored in the TES 28 during daylight hours may be used at night to power the solar steam generator 21 by closing the first valve 23 and opening the second valve 29.

However, the efficacy of this solution demands from the boiler a partial-load (turndown) capability as well as a "rapid response" startup capability in response to supplementary thermal demand by the turbine when the solar field cannot deliver 100% of steam requirements. Typically, the combustion chamber of a biomass boiler can only be heated up at a limited rate (around 100° C. per hour), meaning the startup time from cold is several hours. Each startup entails thermal losses until the system is up to operating conditions. In applications experiencing frequent starts and stops—such as the case here—the startup losses mount significantly.

In addition, the biomass boiler turndown is usually limited to 50%-70% of full load. Thus, during base-load operation when the boiler may be required to rapidly deliver steam to supplement the solar field output, the boiler must be kept "hot", but running it at a minimal load is not feasible. Systems employing such an approach need to be kept hot using some sort of external heat source. The resultant energy losses are significant, reducing overall plant conversion efficiency.

Moreover, in a dispatch scenario where the plant is required to deliver power only during certain hours of the day (e.g. 7:00 to 24:00) this boiler solution would require frequent starts and stops, which would aggravate the inherent problems of biomass boilers noted above and also lower its utilization factor.

Thus while simple, this option does not offer a technically suitable configuration for an efficient base load plant.

FIG. 3 shows schematically a biomass fired steam super-heater 30 arranged in series with the solar steam generator 21. In other respects the arrangement is the same as shown in FIG. 2 and is therefore not described. This configuration aims to overcome one of the efficiency limitations of concentrated solar power based plants, namely the maximum steam temperature that can be achieved. Saturated steam from the solar field can be superheated to 540° C., for example, and thus improve thermal efficiency of the turbine from approximately 39% to 44%.

In order to do so, the super-heater 30 would need to track the steam output from the solar steam generator and deliver a proportional amount of energy for superheating. As noted, modulation of biomass boilers is problematic and so this cannot be done effectively. Moreover, although this arrangement increases cycle efficiency, it does not assist in stabilizing base-load generation or meeting the changing demand requirements. It would therefore be desirable to provide improved hybridization of the two energy sources, so as to improve their utilization efficiency as well as the utilization of the costly equipment comprising the hybrid power plant.

US 2009/205335 discloses a domestic energy supply system wherein the thermal energy of the temperature difference between at least one heat source and at least one heat sink is converted into work by way of a hybrid thermal engine. The thermal engine has a fluid cycle with at least two reservoirs, which, in each case as a condenser to be cooled or an evaporator to be heated, are thermally coupled to the heat source or the heat sink. U.S. Pat. No. 5,444,972 discloses a power plant which uses hydrocarbon fuels in conjunction with solar power to produce electricity.

SUMMARY OF THE INVENTION

An object of the present invention is therefore to provide an improved hybridization system and method that combines and utilizes separate energy sources (thermal, solar and biomass) and thermal energy storage (TES) system, in order to achieve better usage of the energy sources per the specific local needs for electrical power and heating. Such an improved hybridization system produces a final outcome that is greater than the sum of the individual outcomes of the component energy sources.

This object is achieved in accordance with a first aspect of the invention by a hybridization system for use in a hybrid energy plant that comprises a first thermal energy unit powered by a solar field for providing thermal energy to a user via a first heat transfer fluid and a second non-solar thermal energy unit providing thermal energy to said user via a second heat transfer fluid, said hybridization system comprising: a thermal energy storage unit (TES) and mixing unit coupled directly or indirectly to the first thermal energy unit and to the second thermal energy unit for receiving, storing and mixing thermal energy from the first thermal energy unit and the second thermal energy unit so as to form either directly or indirectly a unified heat transfer fluid that is fed to the user;

characterized in that:

the thermal energy storage unit (TES) comprises a first tank to store hot fluid as a medium to store the thermal energy and a second tank to store said fluid in its cold condition, the mixing unit is configured to mix thermal energy derived from the hot fluid with thermal energy derived from the HTF of the solar field, the mixing unit includes a control unit configured to use data from the solar field including actual and forecast weather data to adjust operation parameters of the solar field, the second non-solar thermal energy system and the TES, and to use data from the TES to adjust operation parameters of the second non-solar thermal energy system, and the second non-solar thermal energy unit includes a heater that directly heats the fluid or provides thermal energy to the TES, in parallel with the thermal energy derived from the HTF of the solar field so as to both feed energy to the TES at a common input thereof and to receive the returned colder fluid from the user via a common output thereof.

In another aspect of the invention there is provided a hybridization system for use in a hybrid energy plant that comprises a first thermal energy unit powered by solar energy for providing thermal energy to a user via a first heat transfer fluid (HTF) and a second non-solar thermal energy unit providing thermal energy to said user via a second heat transfer fluid, said hybridization system including a mixing unit for mixing the thermal energy of the first heat transfer fluid and the thermal energy of the second heat transfer fluid either directly or indirectly so as to form a unified heat transfer fluid that is fed to the user.

Preferably, the hybridization system is configured to take into consideration the unique operating characteristics of each individual system, yet allow for their efficient hybrid operation in all possible operating modes (solar only, biomass only and hybrid mode at varying ratios). This is achieved while providing sufficient system flexibility to meet the dynamic needs of the grid, performance targets and improve the overall plant utilization.

Furthermore, a power plant according to the invention, especially when operating as a base-load system, must meet stringent requirements of the grid manager including that the system be fully dispatch manageable, capable of responding rapidly to load demand changes of the grid and capable of responding to fast drops of load without disconnecting from the grid. These kinds of characteristics are not available with a pure CSP system or with a pure biomass energy supply system.

Therefore, the overarching consideration in the design of the plant must be the primary objective of delivering stable, fast response, dispatchable power to the grid, as per schedule, the manageability, the quality and the supply agreements with the local/national electrical authority. The hybridization system should aim to deliver this result with maximum energy efficiency and at an economically justifiable cost.

In order to achieve the above, the hybridization system exhibits the following characteristics:

The turbo-generator should run according to the required delivery schedule at the agreed upon output level irrespective of the source of thermal energy, which in the case of a baseload plant means uninterrupted operation throughout the whole year other than for schedules maintenance periods.

Energy must be delivered seamlessly from the complementary solar and biomass systems that feature different operating characteristics as noted above.

The turbo-generator should be run at its highest efficiency point as frequently as possible to maximize thermal cycle conversion efficiency.

The hybridization system must be designed to minimize thermal losses and energy lost to startup processes both in the solar field and the biomass system.

The efficiency of heat to electricity conversion of the combined system must be higher than the efficiencies of each sub-system operating alone.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols. Likewise components that are common to the known systems described above will be referenced by the same reference symbols.

Figure 1:
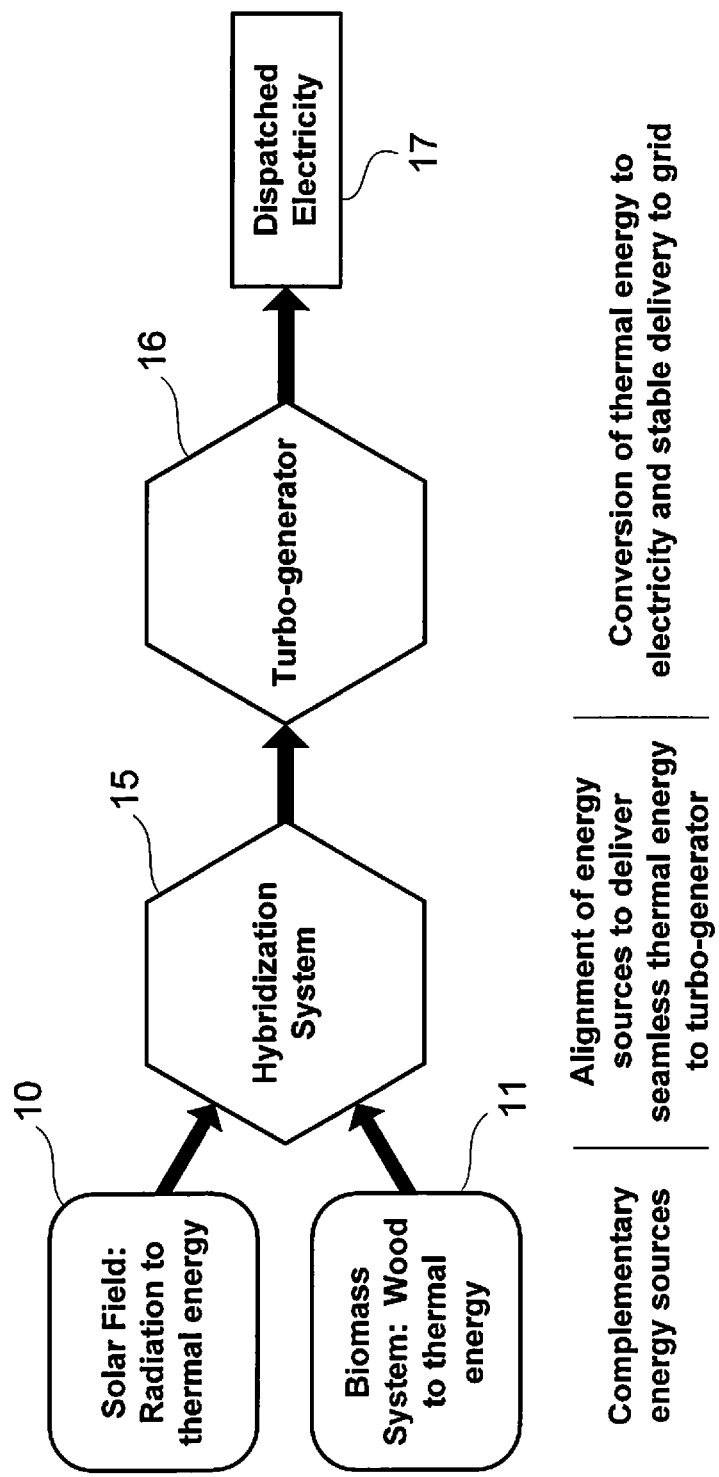
FIG. 1 is a block diagram showing schematically a conventional hybridization system.
Figure 2:
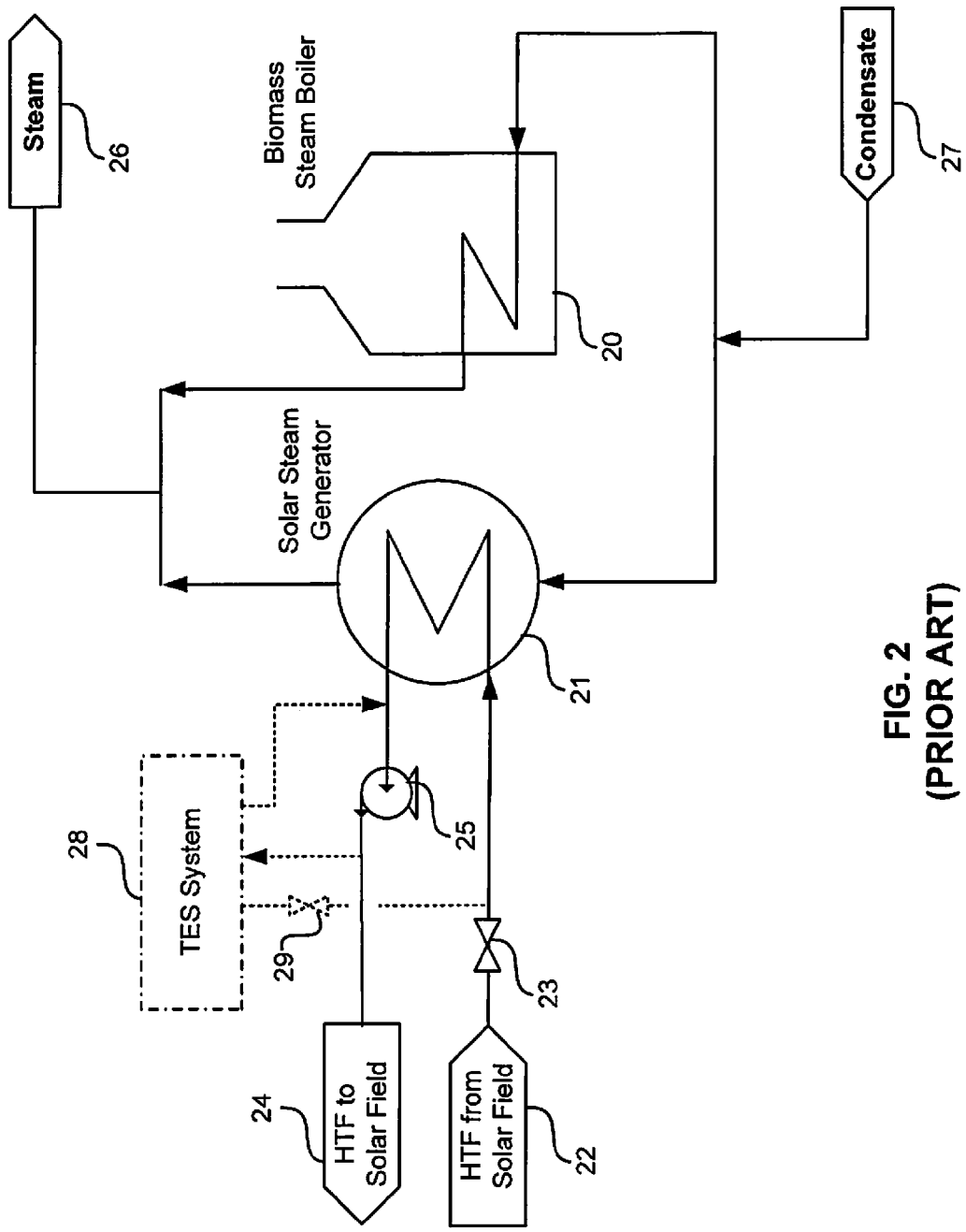
FIG. 2 is a block diagram showing schematically conventional use of a biomass boiler in parallel with a Solar Boiler.
Figure 4:
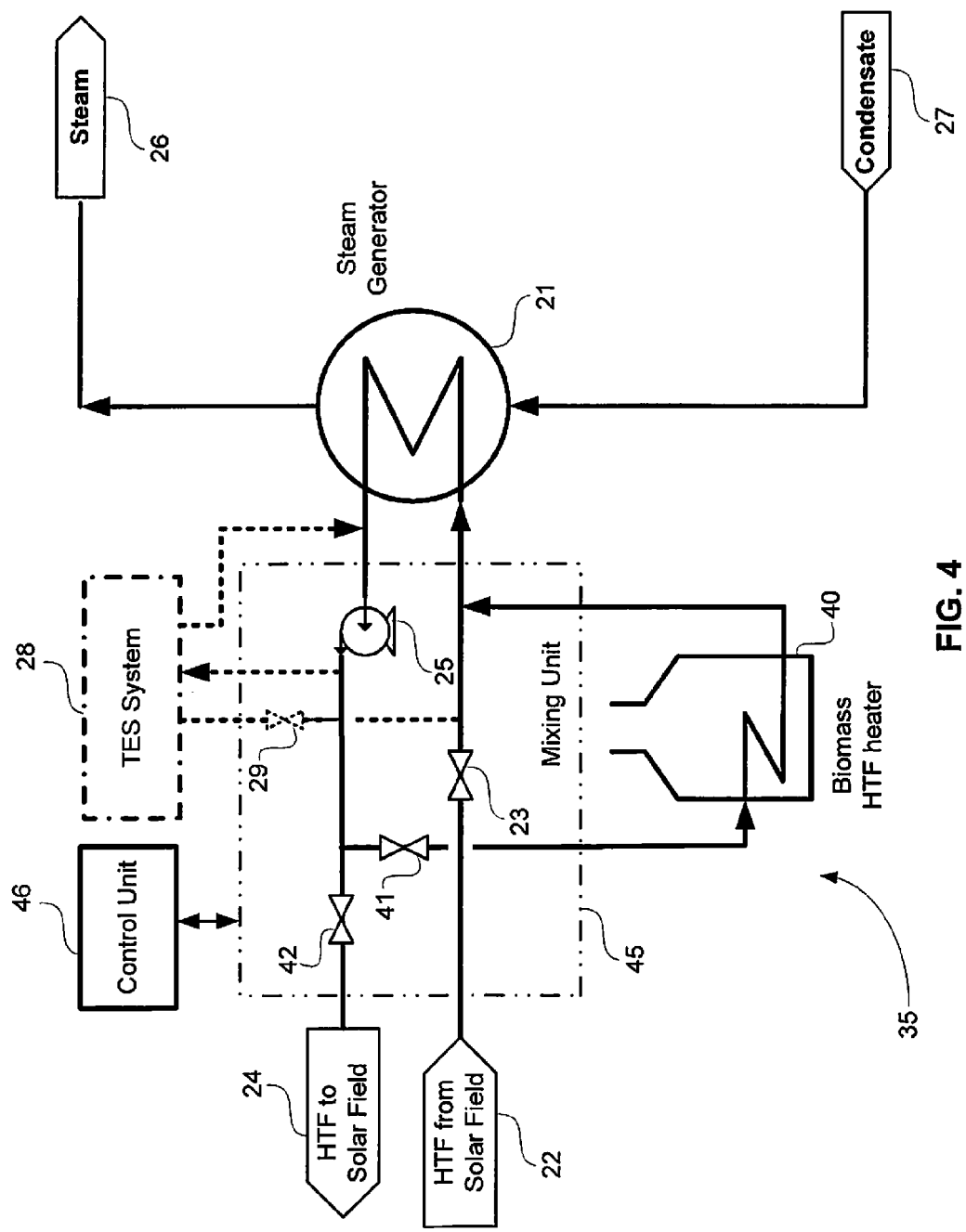
FIG. 4 is a block diagram showing schematically use of a biomass super-heater in accordance with a first embodiment of the invention.

FIG. 4 shows a first embodiment of a hybrid energy plant 35 having a biomass fired heat transfer fluid (HTF) heater 40 arranged in parallel with the solar field via a third valve 41 and which can be used to supplement thermal output of the solar field either partially or completely in times of little or no solar radiation. A fourth valve 42 determines the amount of cooled HTF (typically oil) from the steam generator 21 that is returned to the solar field 10 or, optionally, is fed to the heater 40. Biomass fuel and also natural gas or LNG can be used for firing but also any type of fuel that undergoes combustion can be used within the heater and is true all of the systems described herein. The hybridization system 15 includes a mixing unit 45 shown in dotted outline, which includes the valves 23, 29, 41 and 42 as well as the pump 25, all of which are controlled by a control unit shown schematically as 46. The mixing unit 45 serves to mix the thermal energy of the first heat transfer fluid and the thermal energy of the second heat transfer fluid either directly or indirectly so as to form a unified heat transfer fluid that is fed to the user. In this system the hot HTF can be used to keep the biomass heaters "hot" when required, so as to reduce start up time. Nevertheless, similar negative issues observed in the prior art system shown in FIG. 2 apply to this system as well. Biomass firing cannot be moderated as easily as LNG or NG (natural gas) burners, meaning the turndown ratio is still a major problem as well as the inability of this system to quickly respond to the dynamic load changes of the grid.

Other limitations of this configuration are that the biomass heater will be restricted to the solar field operating conditions and that the heater utilization will be relatively low as compared to the potential of a biomass heater that can operate around the clock. Thus while technically better than the prior art system shown in FIG. 2, this configuration is not in many cases an effective fit.

These limitations are at least partially addressed by other embodiments of the invention in at least one of the following mutually independent conditions:

the biomass HTF is not steam;
the HTF from the biomass and the HTF from the solar field are mixed prior to being fed to the user. This is different from known systems where, for example, thermal energy from the solar field is converted to steam that is then superheated using thermal energy from a biomass system prior to feeding to a steam turbine.
the mixing unit operates over the full working temperature range of the solar field.

Figure 3:
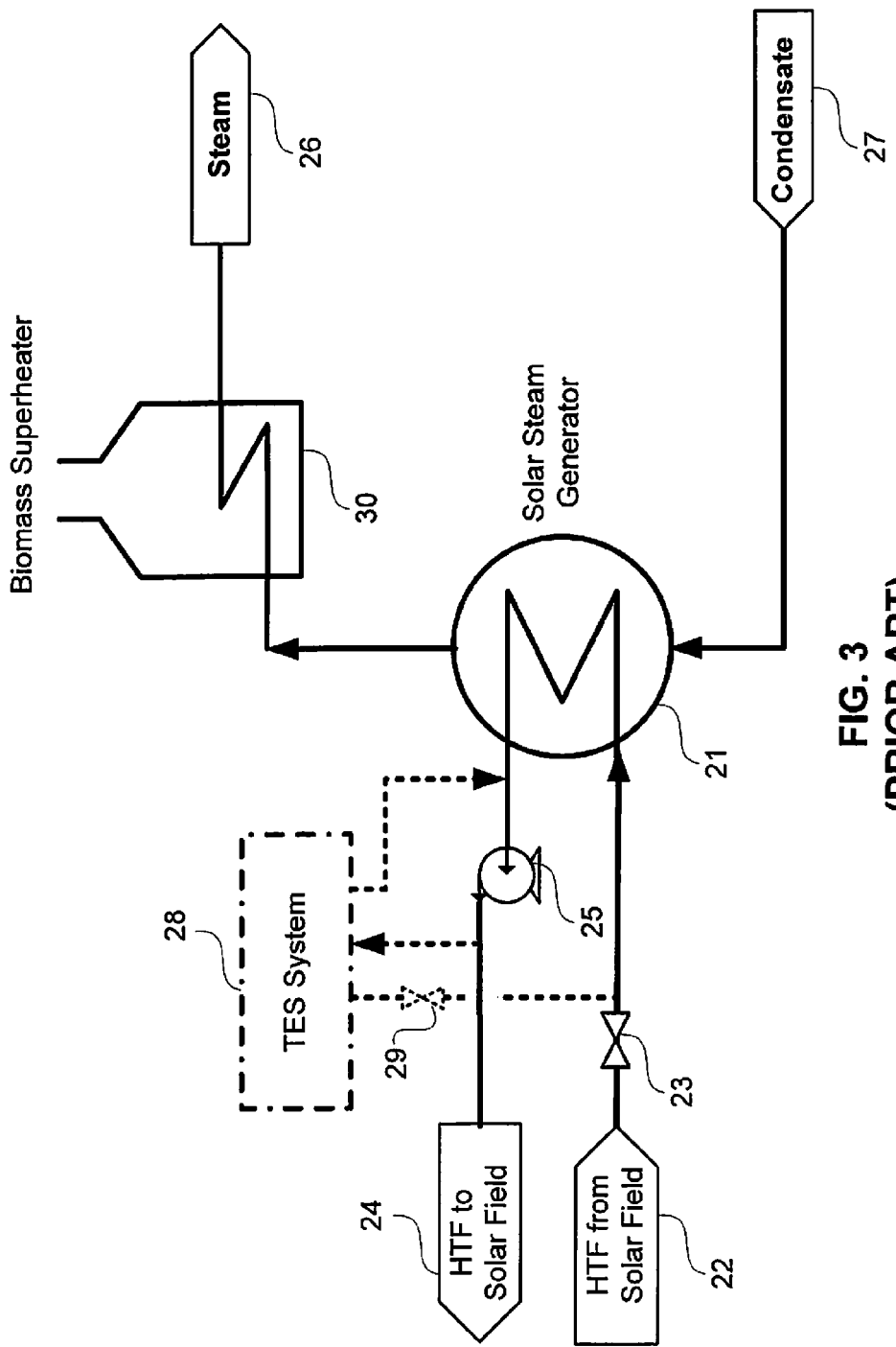
FIG. 3 is a block diagram showing schematically conventional use of a biomass boiler in parallel with a solar field.
Figure 5:
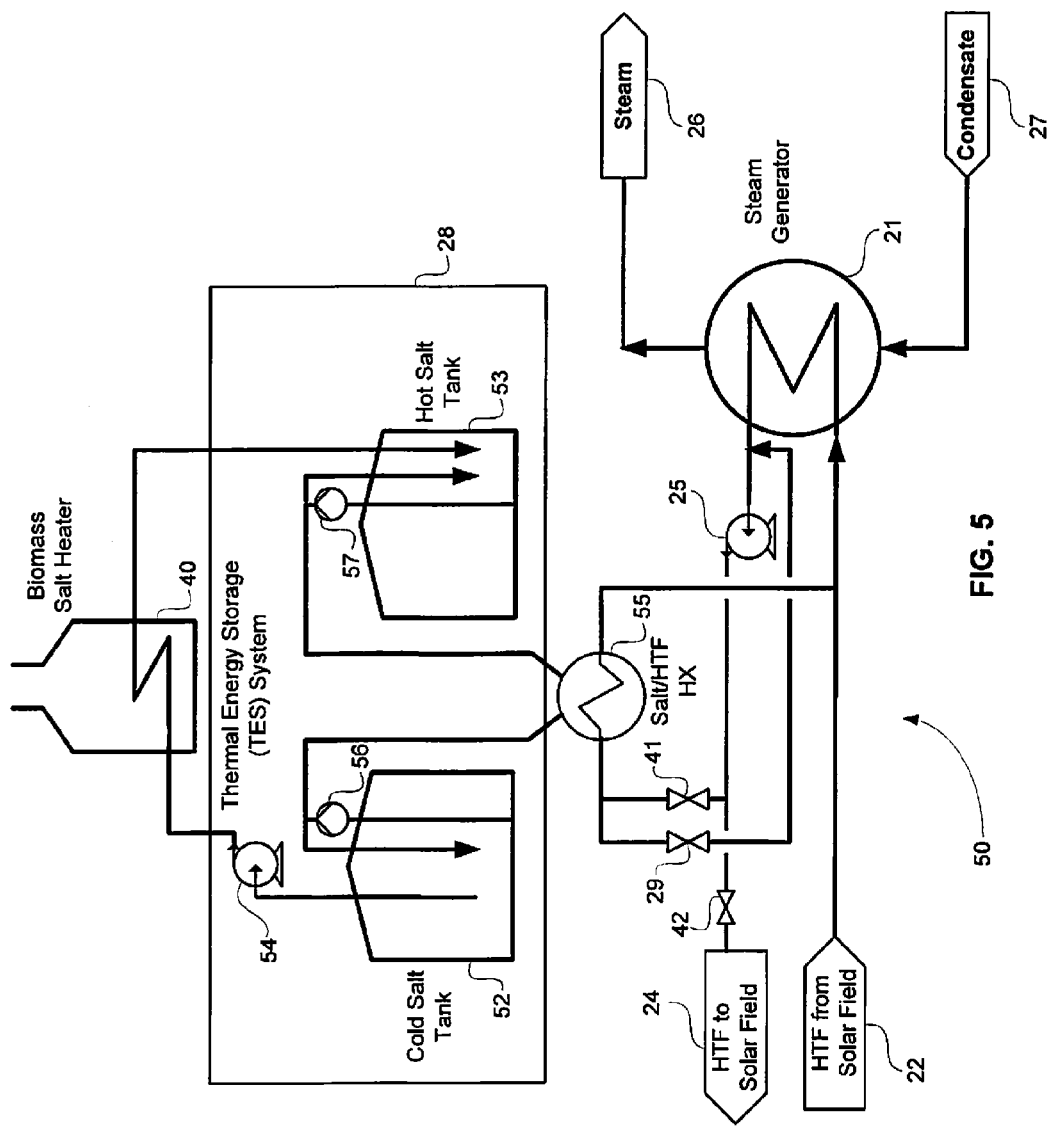
FIG. 5 is a block diagram showing schematically use of a biomass salt heater with steam generation on the HTF side in accordance with a second embodiment of the invention.

FIG. 5 shows schematically a power plant 50 according to a second embodiment including a biomass fired HTF heater 40 to charge directly (i.e. provide thermal energy to) the TES system 28, in parallel with the CSP's HTF system. Steam is generated in the steam generator 21 which, as used herein constitutes a "user", through discharge of the TES 28 to the HTF system as required. Molten salt is used as the heat transfer fluid of the biomass heater 40 to charge the TES directly as distinct from the systems shown in FIGS. 2 and 3, where the heater heats HTF, which then heats the molten salt. The TES 28 in this embodiment comprises a cold salt tank 52 from which molten salt is pumped to a hot salt tank 53 by a pump 54. Thermal energy derived from the heated molten salt is mixed with thermal energy derived from the HTF of the solar field in a salt/HTF heat exchanger 55, which can work in forward and backward flow directions, and can feed the returned relatively cold molten salt to the cold salt tank 52 and heated molten salt to the hot salt tank 53. Non-return valves 56 and 57 prevent the molten salt in the respective tanks from flowing back to the salt/HTF heat exchanger 55. The valves 29, 41, 42 and pump 25 are controlled by the control unit 46 according to whether thermal energy from the solar HTF is to be stored in the TES or whether stored thermal energy is to be used to supplement the solar HTF. When the valve 42 is open and valves 29 and 41 are closed, all cooled HTF (typically oil) from the steam generator 21 is returned to the solar field 10 via the pump 25. If the valves 29 and 42 are closed and the valve 41 is open, the cooled HTF returned by the pump 25 is fed to the salt/HTF heat exchanger 55 where it extracts the heat from the molten salt fed thereto from the hot salt tank 53. This cools the hot molten salt, which returns to the cold salt tank 52, while the heated solar HTF is again fed to the steam generator 21.

Thermal energy is stored in the TES 28 in the opposite manner by opening the valves 29 and 42 closing the valve 41. Hot solar HTF is fed to the salt/HTF heat exchanger 55 where it meets cold molten salt that is fed thereto from the cold salt tank 52. The molten salt extracts the heat from the solar HTF and hot molten salt returns to the hot salt tank 53, where its thermal energy is stored so as to be available when there is inadequate high-temperature solar HTF. The cooled solar HTF is returned from the salt/HTF heat exchanger 55 via the open valve 29 to the solar field.

In such a configuration, the single heat exchanger 55 is thus used in forward and backward flow directions to complete all mixing and transferring of the thermal energy between the first thermal energy unit 10 and the second non-solar thermal energy unit 11 and the thermal energy storage 28. The system uses the thermal energy of the solar field to generate steam directly. Excess energy is passed to the TES system 28, as is done in many conventional solar thermal plant designs. However, according to the present embodiment, the biomass heater 40 directly heats the thermal salts of the TES system, or provides thermal energy to the TES, in parallel with the CSP's HTF/salt heat exchanger 55 so as both to feed energy to the user at a common input thereof and to receive the returned colder HTF from the user via a common output thereof. This is ensured by the mixing unit 45 which operates at least over the full working temperature range of the solar field. The biomass is burned in a furnace and the hot gasses are primarily used to heat the biomass's HTF (i.e. molten salt), with an economizer attached to the system either to heat incoming air for combustion or the CSP's HTF. Optionally, the biomass heater 40 may heat the thermal salts of the TES system 28 via a heat exchanger (not shown), which allows different types of molten salt to be used in the biomass heater 40 and the TES 28.

This arrangement differs from regular power plants using biomass fuel in that direct connection between the biomass boiler/heater and the turbine is eliminated. This avoids direct flow of thermal energy from the biomass to the turbine and these two main sub-systems of the plant can thus operate mutually independently at different times and at different loads. A variation of this configuration would allow portion of the thermal energy coming from the biomass heater to be fed directly to the steam generation chain. This arrangement reflects a complementary alignment of the characteristics of the solar and biomass systems as desired. The TES system 28 acts as a buffer for the variation in the solar system. The biomass heater 40 operation is decoupled from the demand for steam. This allows the biomass heater to be operated within the identified constraints of these systems while stabilizing the supply of steam. Thermal energy is drawn from the TES system 28 as demanded by the turbine load irrespective of the instantaneous ability of either the biomass system or the CSP system to supply that energy. Additionally, little start-up heat is wasted from the biomass heater 40, as any of the biomass salts not yet at the required high temperature may be recycled to the cold tank via a return line. The size of the TES system 28 and biomass heater 40 needs to be optimized for the intended operating schedule. For instance, if the plant is only required to dispatch power for 16 hours of the day at 100%, then the biomass heater 40 may be sized at 66% to operate 24 hours, provided the TES system is sized sufficiently to store the 8 hours of 66% energy. At the same time, the TES system sizing must reflect the proper economics of the solar field as well. Ultimately, economic considerations will determine the relative sizes of the solar field, biomass heater and TES system.

To allow all operating conditions required of the plant a mixing system is used. Such mixing includes several pumping devices according to the number of the heat transfer fluids and storing media used, mechanical devices including piping system, vessels and control valves to allow the mixing of the fluid streams and transferring thermal energy between all units of the plant and instrumentation and control devices to control and adjust the operation of all units of the plant. The control unit 46 uses several input data sources including from the user, from the first and the second thermal energy units, from the TES and optionally also actual and forecast weather data. The control unit functions to adjust and optimize the operation of all units of the system as well as to start and shut down these units. It functions to the extent possible by dictated priorities which includes to supply thermal energy to the user as per its demands, to maximize the use of the free solar thermal energy, to maximize the use of free waste thermal energy, to prepare and optimize the required amount of thermal energy in the TES and to run the second non-solar thermal system to supplement the first thermal energy units.

Overall, this option offers a highly flexible and applicable solution for a reliable, fast response manageable, base-load capable electric generation plant.

Figure 6:
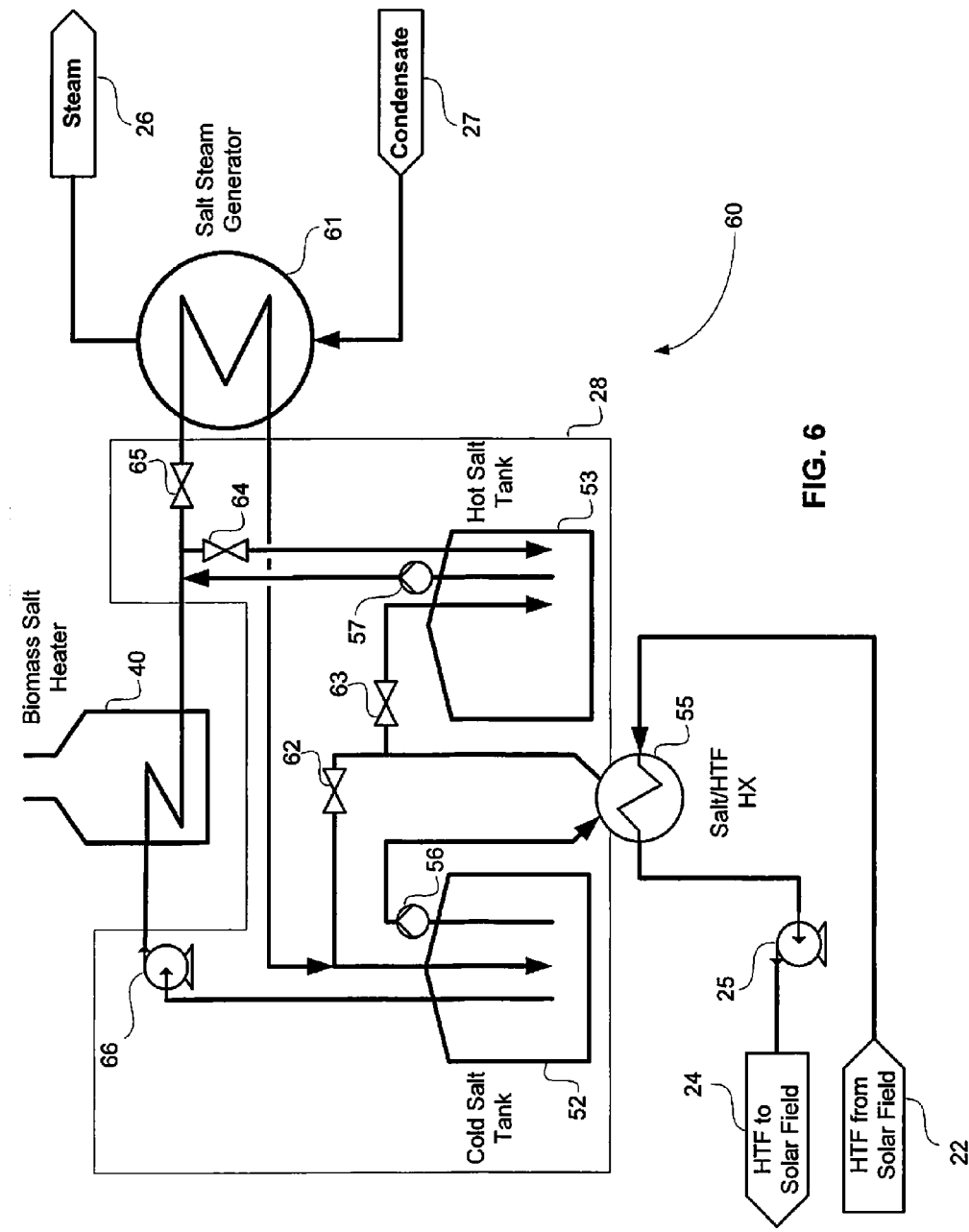
FIG. 6 is a block diagram showing schematically use of a biomass salt heater with steam generation on the salt side in accordance with a third embodiment of the invention.

FIG. 6 shows a hybrid plant 60 according to a third embodiment of the invention relating to a biomass fired salt heater 40 to generate steam and charge the TES system. The solar field is used only to charge the TES constituted by the cold and hot molten salt tanks 52 and 53. Steam is generated in the salt steam generator 61 through discharge of the TES to the salt system as required. This embodiment is similar in concept to the previous embodiment described above with reference to FIG. 5 but reverses the steam generation configuration. The steam is generated directly from biomass on the salt side of the TES system and only indirectly from the solar field always via the TES system. A variation of this configuration allows a portion of the thermal energy coming from the solar field to be fed directly to the steam generation chain. The control unit 46 opens and closes control valves 62, 63, 64, 65 and operates pump 66 to store thermal energy in the TES 28 or feed it to the salt steam generator as required.

This reversal provides several additional advantages over the previous option:

The salt/HTF heat exchangers are now only used for charging, and so even during periods of low radiation when the biomass boiler is being used to generate steam, any marginal solar thermal energy can be sent to storage. In particular, cold salt which is only partially heated by the HTF can be recycled to the cold tank if the HTF cannot achieve full design temperature. This increases the "stock" of thermal energy collected by the solar field.

Direct generation of steam is on the salt/biomass side rather than on the HTF side. This means a slightly higher salt temperature can be used from the biomass heater (within the design range of the turbine and other systems) resulting in a higher turbine efficiency.

This arrangement differs significantly from regular biomass power plants due to the dual possibility it offers to stabilize the electricity generation and to allow the desired fast response characteristic:

The biomass heater can be set to operate smoothly at fixed rate and to and to provide a fixed rate of thermal energy to the steam generator. At times that the load demand is falling extra thermal energy from the biomass heater will be directed immediately to the TES system.

Similarity, when the grid demand increases, a boost of thermal energy can be supplied instantaneously to the steam generator from the TES system without affecting the constant rate of the biomass heater.

As per the previous option, this arrangement also allows efficient uses of the two sources of thermal energy, CSP and BM or the non-solar energy system, through the TES buffer. This is true on both a daily basis and a seasonal basis.

Ultimately, which of the second or third embodiment is applied will depend on the relative costs of the two alternatives and the performance advantage of one over the other. This will relate largely to how the thermal energy sent to the turbine is split between solar and biomass sources. In general, if more energy is provided from solar, better system efficiency will be achieved by having direct solar-steam generation (second embodiment), whereas if more energy comes from biomass, the reverse applies (third embodiment), owing to the associated effects on parasitic requirements and thermal cycle efficiency.

The above two embodiments show "split" thermal systems, wherein there is a distinct oil-based heat transfer fluid (HTF) system on the solar side, and a thermal salt system for the storage and biomass side. The reasons for this relate to the physical properties required for the two systems, which are mutually incompatible using currently utilized HTF and thermal salts. One of the critical characteristics of the HTF fluid is that it remains fluid at low ambient temperatures, and this favours the use of thermal oils. Critical characteristics for the thermal storage are low cost and high stability and energy content while a low melting point is not as necessary. This favours the use of molten salt. However, other HTF and thermal salts are available and can permit a single heat transfer system, which uses the same HTF/molten salt on both the solar side and the TES/biomass side.

Figure 7:
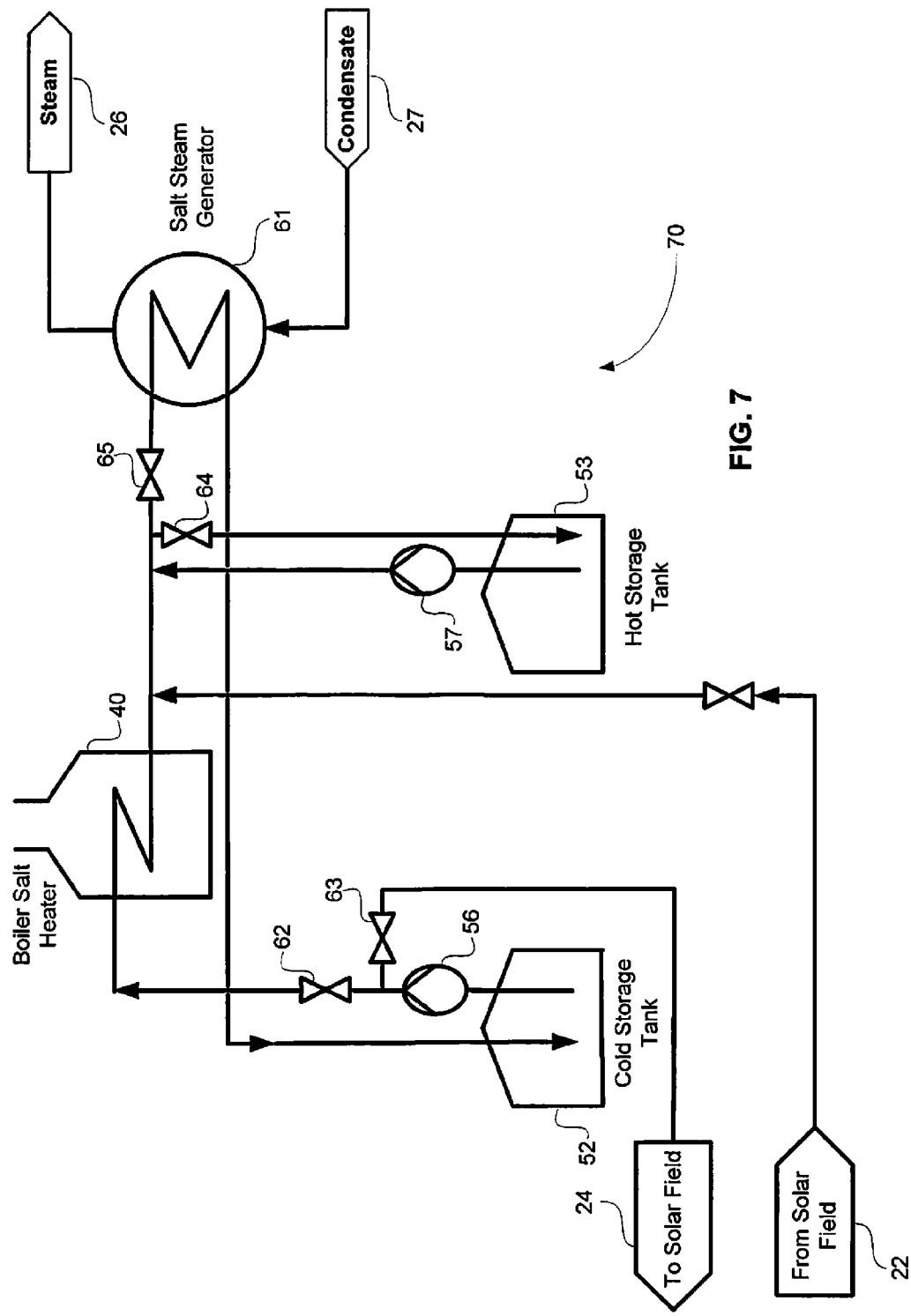
FIG. 7 is a block diagram showing schematically the use of the same heat transfer fluid or oil in all the CSP, TES and BM systems in accordance with a fourth embodiment of the invention.

Accordingly, the invention includes a further configuration, as shown in FIG. 7, for the hybrid CSP and BM system where the above innovative configurations are further improved by use of the same fluid or oil in both the CSP and the BM systems. The successful application of these fluids and salts as described below saves considerable investment in heat exchange systems reduces auxiliary power consumption and generally simplifies system configuration and operation. This approach is similar to the embodiment shown in FIG. 6 with the improvement of the elimination of the HTF/Salt heat exchangers. Another improvement can be obtained by allowing also direct supply of the thermal energy from the CSP to the steam generator (in addition to the charging possibility of the TES from the CSP).

In addition, although the above descriptions refer to thermal energy from biomass, the same approach can be applied to other sources of thermal energy such as sources based on coal, bio-gas/fuel, liquefied natural gas (LNG), liquefied petroleum gas (LPG) or distillates and on all other kind of fossil fuels. Even though some of the resources would have faster response time in comparison to a biomass source, nonetheless the above described invention allows for the hybridization with these source in hybrid with a solar thermal source in order to create a reliable and efficient baseload power plant that is capable of generating electricity during all year long with full manageability capabilities as per the requirements and discretion of the grid operator.

In addition, although the above descriptions refer to a TES system comprising a two-tank (hot and cold) storage system as is common in solar thermal plant designs currently, the same approach can be applied to other TES systems such as single TES tank designs (thermocline), concrete and graphite systems, and phase change material (PCM) TES designs.

As a further improvement, all three of the previous embodiments can also be supplemented by superheating, either directly as in the last embodiment or through an extended salt system with a salt/steam super-heater and re-heater.

It will be apparent that while the invention has been described with reference to some specific embodiments, many variations are possible. For example, in some embodiments, the HTF from the biomass and the HTF from the solar field may be mixed prior to being fed to the user. While in the embodiments described, the TES 28 uses a two tank configuration, it may use a single tank to store hot fluid as a medium to store the thermal energy.

The invention claimed is:

1. A hybridization system for use in a hybrid energy plant that comprises a first thermal energy unit powered by a solar field for providing thermal energy to a user via a first heat transfer fluid (HTF) and a second non-solar thermal energy unit providing thermal energy to said user via a second heat transfer fluid (HTF), said hybridization system comprising:
    a thermal energy storage unit (TES) and mixing unit coupled directly or indirectly to the first thermal energy unit and to the second thermal energy unit for receiving, storing and mixing thermal energy from the first thermal energy unit and the second thermal energy unit so as to form either directly or indirectly a unified heat transfer fluid (HTF) that is fed to the user, the thermal energy storage unit (TES) comprising a first tank to store hot fluid as a medium to store the thermal energy and a second tank to store said fluid in its cold condition;
    the mixing unit being configured to mix thermal energy derived from the hot fluid with thermal energy derived from the HTF of the solar field,
    the mixing unit including a control unit configured to use data from the solar field including actual and forecast weather data to adjust operation parameters of the solar field, the second non-solar thermal energy system and the TES, and to use data from the TES to adjust operation parameters of the second non-solar thermal energy system, and
    the second non-solar thermal energy unit including a heater that directly heats the fluid or provides thermal energy to the TES, in parallel with the thermal energy derived from the HTF of the solar field so as to both feed energy to the TES at a common input thereof and to receive the returned colder fluid from the user via a common output thereof.

2. The system according to claim 1, wherein the second non-solar thermal energy unit is powered by biomass fuel, coal, bio-fuel, liquefied natural gas (LNG), liquefied petroleum gas (LPG) or distillates or by any other kind of fossil fuels.

3. The system according to claim 1, wherein the first heat transfer fluid and the second heat transfer fluid are identical.

4. The system according to claim 1, wherein the second heat transfer fluid is not steam.

5. The system according to claim 3, wherein the second non-solar thermal energy unit is powered by biomass fuel and the HTF from the biomass and the HTF from the solar field are mixed prior to being fed to the user.

6. The system according to claim 5, wherein the first thermal energy unit and the second non-solar thermal energy unit are connected in parallel so as both to feed energy to the user at a common input thereof and to receive the returned colder HTF from the user via a common output thereof, either directly or via the TES, whereby the mixing unit operates at least over the full working temperature range of the solar field.

7. The system according to claim 3, wherein at least one of the first thermal energy unit and the second thermal energy unit is connected in parallel directly or via a heat exchanger to the TES and to the user.

8. The system according to claim 3, wherein the said the second heat transfer fluid is molten salt.

9. The system according to claim 3, wherein the TES uses as a thermal energy storage medium the same fluid as at least one of the heat transfer fluids used in the first or the second thermal energy systems.

10. The system according to claim 9, wherein the said thermal energy storage medium is molten salt.

11. The system according to claim 3, wherein the TES uses a solid medium to store the thermal energy.

12. The system according to claim 3, wherein a single heat exchanger is used in forward and backward flow directions to complete all mixing and transferring of the thermal energy between the first thermal energy unit and the second non-solar thermal energy unit and the thermal energy storage.

13. The system according to to claim 3, wherein the mixing unit includes at least one pump and control valves controlled by a control unit.

14. The system according to to claim 3, wherein said control unit is configured to use data from the user to adjust operation parameters of the solar field, the second non-solar thermal energy system and the TES.

15. The system according to claim 3, wherein said control unit is configured to adjust and optimize the operation of units of the plant as per dictated priorities which includes to supply thermal energy to the user as per its demands, to maximize the use of the free solar thermal energy, to maximize the use of free waste thermal energy, to prepare and optimize the required amount of thermal energy in the TES and to run the second non-solar thermal system to supplement the first thermal energy units.

16. The system according to claim 3, wherein the first heat transfer fluid, the second heat transfer fluid and the energy storing media in the TES are all molten salts.

17. The system according to to claim 3, wherein the second non-solar thermal energy system is powered by waste heat from industrial processes, cogeneration units, combined cycle power units, power plants and waste treatment units.

18. The system according to to claim 3, further including an economizer configured to use waste thermal energy from the second non-solar thermal energy system to heat incoming air for combustion in the second non-solar thermal energy system and/or the first HTF.

* * * * *